United States Patent
Hoetzeldt et al.

(10) Patent No.: US 8,336,804 B2
(45) Date of Patent: Dec. 25, 2012

(54) AIRCRAFT CABIN PANEL WITH CORE RECESSES FOR ACOUSTIC ABSORPTION

(75) Inventors: Stephan Hoetzeldt, Bremen (DE); Christian Thomas, Hamburg (DE)

(73) Assignee: Airbus Operations GmbH (DE)

( * ) Notice: Subject to any disclaimer, the term of this patent is extended or adjusted under 35 U.S.C. 154(b) by 322 days.

(21) Appl. No.: 12/639,132

(22) Filed: Dec. 16, 2009

(65) Prior Publication Data

US 2010/0148001 A1  Jun. 17, 2010

Related U.S. Application Data

(60) Provisional application No. 61/201,980, filed on Dec. 17, 2008.

(30) Foreign Application Priority Data

Dec. 17, 2008 (DE) .......................... 10 2008 062 701

(51) Int. Cl.
  *B64C 1/40* (2006.01)
(52) U.S. Cl. ..................... 244/1 N; 181/288; 181/292
(58) Field of Classification Search ................... 244/1 N, 244/121, 117 R, 119; 181/210, 288, 292
  See application file for complete search history.

(56) References Cited

U.S. PATENT DOCUMENTS

| | | | |
|---|---|---|---|
| 3,770,560 A | 11/1973 | Elder et al. | |
| 6,065,717 A * | 5/2000 | Boock | 244/1 N |
| 6,179,086 B1 | 1/2001 | Bansemir et al. | |
| 2003/0141144 A1* | 7/2003 | Wilson | 181/292 |
| 2003/0178250 A1* | 9/2003 | Putt et al. | 181/290 |
| 2006/0272279 A1* | 12/2006 | Palumbo et al. | 52/783.1 |
| 2007/0292658 A1 | 12/2007 | Thomas et al. | |

FOREIGN PATENT DOCUMENTS

| | | |
|---|---|---|
| DE | 3720371 | 1/1989 |
| DE | 19804718 | 8/1999 |
| DE | 20016051 U1 | 2/2001 |
| DE | 102005016653 | 10/2006 |
| DE | 102005024549 B3 | 12/2006 |

\* cited by examiner

*Primary Examiner* — Tien Dinh
*Assistant Examiner* — Nicholas McFall
(74) *Attorney, Agent, or Firm* — Lerner, David, Littenberg, Krumholz & Mentlik, LLP

(57) ABSTRACT

An aircraft cabin panel for acoustic absorption in an interior space includes a core layer, a first cover layer and a second cover layer. The first cover layer includes a space-enclosing first surface, and the second cover layer is arranged opposite the first cover layer. The first cover layer is acoustically transparent, and the core layer includes a honeycomb core with a plurality of tubular or honeycomb-like cells that are open throughout the thickness of the honeycomb core. The honeycomb core on the face pointing towards the first cover layer extends parallel to the first cover layer so as to be continuously throughout, and on the face pointing towards the second cover layer comprises recesses which extend over several cells. Absorbers are accommodated in the recesses.

14 Claims, 2 Drawing Sheets

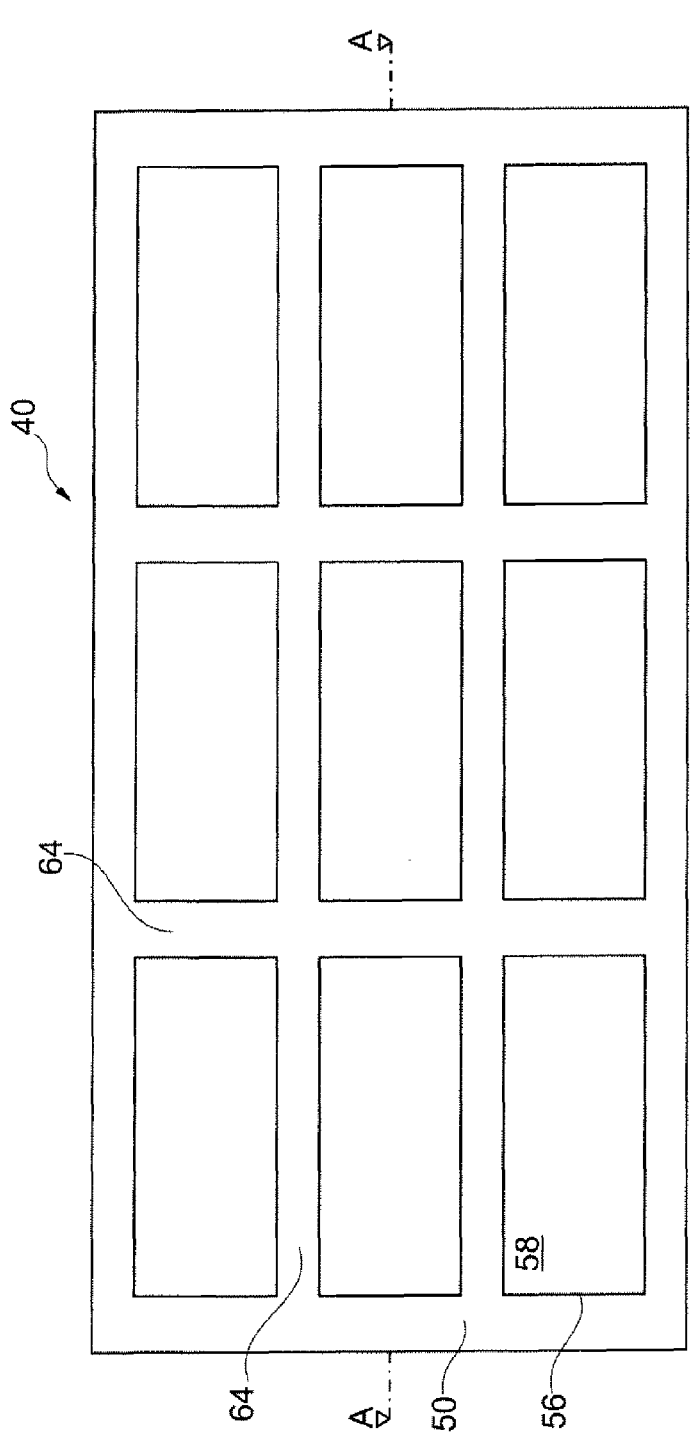
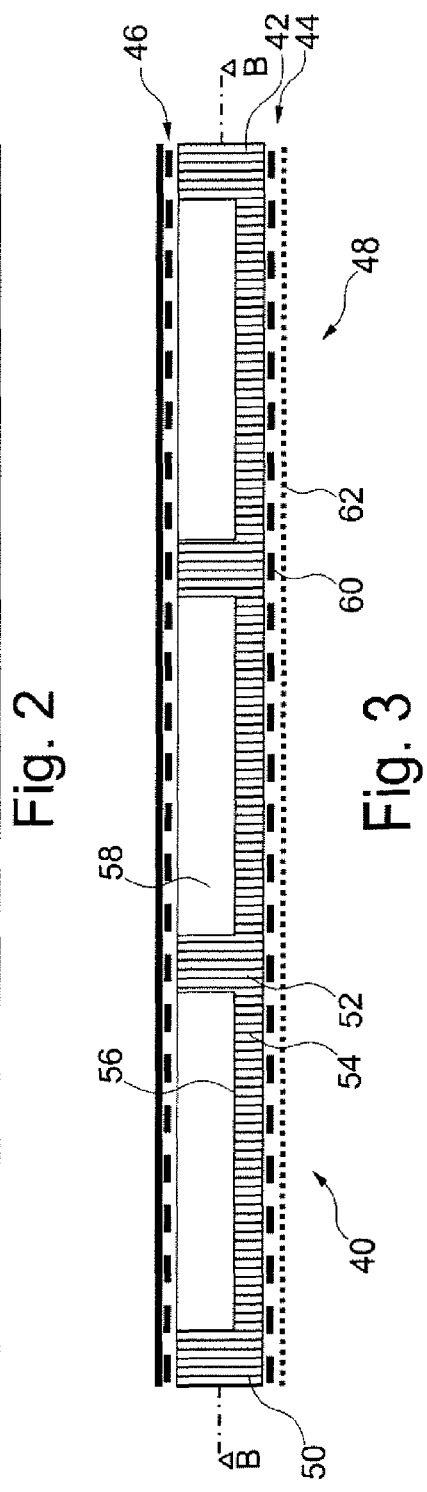
Fig. 2
Fig. 3

AIRCRAFT CABIN PANEL WITH CORE RECESSES FOR ACOUSTIC ABSORPTION

CROSS-REFERENCE TO RELATED APPLICATIONS

This application claims the benefit of the filing date of U.S. Provisional Patent Application No. 61/201,980 filed Dec. 17, 2008, the disclosure of which is hereby incorporated herein by reference.

BACKGROUND OF THE INVENTION

The present invention relates to an aircraft cabin panel for acoustic absorption in an interior space. The invention in particular also relates to an aircraft with an interior lining with sound-absorbing panels.

Sound-absorbing panels are used in aircraft in the region of the cabins in order to improve the acoustic characteristics of the cabin interior in that the noise that is perceived to be disagreeable is reduced by means of the panels. The increasing demand for convenience in interior spaces generally goes hand in hand with increasing demands for improved quality of the environment within an aircraft because among other things there is an increased demand also for improved in-flight acoustics. For this purpose it is desirable in the interior of, for example, aircraft passenger cabins to use panels for acoustic absorption in order to reduce the noise load in the cabin interior. The noise to be reduced is, for example, noise generated by the engines, noise caused by mechanical air conditioning plant, and not least also noise generated by the occupants in the aircraft themselves. Apart from the reduction in the incoming noise, generally-speaking an increase in the acoustic absorption area provides one possibility of reducing the noise level within an aircraft interior, for example within an aircraft cabin. Furthermore, the reduction of acoustic reflections in close proximity to the passengers also contributes to an improvement in the acoustic quality. To achieve the first-mentioned reduction of acoustic transmission from the engine and the reduction in boundary layer noise into the cabin, in passenger aircraft, for example, the acoustic effectiveness of the insulation material is increased, the decoupling of structure-borne noise of the cabin lining elements is improved, or insulation of airborne noise of the cabin lining elements is optimised. These measures are associated with a disadvantage in that not only do they often go hand in hand with an undesirable increase in weight, but also in that they are unable to reduce the noise generated in the cabin itself. In order to improve the acoustic characteristics of aircraft cabins, for example the use of the region of the cabin lining for a broadband sound-absorbent effect is known. For example, from DE 10 2005 016 653 A1 a sound-absorbing panel is known in which a sandwich panel is designed so as to be acoustically transparent, and on the panel face that points away from the cabin a porous absorber is arranged which is effective over a broad spectrum. The acoustic transparency of the sandwich panel, which represents the actual cabin lining, is achieved in that a honeycomb core structure is provided that comprises acoustically-transparent cover surfaces. Due to the transparency of the panel, its weight cannot be used for the purpose of acoustic insulation. The absorber entails a requirement for increased design space and additional weight. However, any increase in weight is associated with economic and ecological disadvantages during operation of an aeroplane or some other aircraft. In the context of ever increasing fuel costs and the generally-recognised importance of $CO_2$ emission, the aspect of component weight in the development of components in the field of aviation assumes a central position.

BRIEF SUMMARY OF THE INVENTION

There may thus be a need to provide a panel with improved acoustic-absorption characteristics for use in aircraft, which panel is optimised in relation to its requirement for design space and to its weight.

In a preferred embodiment an aircraft cabin panel for acoustic absorption in an interior space is provided, which aircraft cabin panel comprises a sandwich construction with a core layer, a first cover layer and a second cover layer. The first cover layer comprises a space-enclosing first surface; the second cover layer is arranged opposite the first cover layer; the first cover layer is designed so as to be acoustically transparent; and the core layer comprises a honeycomb core with a multitude of tubular or honeycomb-like cells that are open throughout the thickness of the honeycomb core. The honeycomb core on the face pointing towards the first cover layer extends parallel to the first cover layer so as to be continuously throughout, and on the face pointing towards the second cover layer comprises recesses which extend over several cells, wherein absorbers are accommodated in the recesses.

The panel according to the invention comprises an advantage in that within the panel additional absorber elements are provided, which in principle has a favourable effect on the design space required, and moreover is also associated with advantages in the manufacture of an aircraft, in particular in the finishing of the cabin. Because the cover layer that faces the cabin space is acoustically transparent, from this face sound input into the panel can take place. Because the cells of the honeycomb core are open, the sound entering through the first cover layer can penetrate the honeycomb core and can impact the absorber. When the sound enters the absorber, sound absorption takes place.

The construction of the recesses for accommodating the absorbers preferably takes place with the use of materials used in aircraft construction and in particular in the interior fitting of aircraft. This aspect is of fundamental importance in aircraft construction because all the materials used in an aircraft require special certification procedures. With the use of conventional materials, i.e. with the use of materials that are all already qualified or in other words have been certified, there is a significantly simpler certification procedure than is the case with the use of new materials, i.e. materials that so far have neither been certified nor qualified. Apart from known materials, known production processes also play a role, because they are also taken into account in the certification procedure.

It is thus preferable in the aircraft cabin panel according to the invention to make use of known materials and known manufacturing processes in order to keep the certification procedures required in the context of aviation as simple as possible, wherein in this context both time-related and financial aspects play an important part.

Due to the recesses in the honeycomb core different absorbers can be used in the aircraft cabin panel according to the invention. This results in improved adaptation options. It is, for example, possible to provide panels in which in several recesses an identical absorber, i.e. an identical absorber material, is used.

Apart from this it is also possible to provide aircraft cabin panels where the recesses comprise different absorbers. In this way panels can be provided in which the future installation position can already be taken into account in such a way that in different regions of the panel different absorbers are arranged which in relation to their absorption characteristics, for example in relation to the frequency spectrum to be covered, can be better adapted.

The honeycomb core which at the front, i.e. on the face pointing towards the interior space, is continuously throughout, makes it possible to provide a surface of the cabin panel that meets the stringent requirements, for example those to be met in passenger aircraft with a first class section. Providing a honeycomb core on the front, which honeycomb core is extending continuously throughout, in particular also means that known cover layer designs can be used, so that the panels according to the invention can be adapted to the hitherto used cabin layout because their surface, i.e. their visible surface, does not differ from that of those panels in which, for example, only one continuous honeycomb core is provided, but in which there are no absorber elements.

In the context of the present invention, the term "acoustic transparency" refers to the characteristic of letting the sound impacting the area pass through as far as possible without any hindrance. Acoustic transparency thus relates in particular to the frequency range associated with the understanding of speech. Normally a spectrum of from 500 to 4000 Hz is stated for this. Acoustic transparency thus means that sound waves should as far as possible be let through in the entire frequency spectrum mentioned. Only then is it possible to provide broadband influencing of the acoustics in the cabin space in the sense of improving the understanding of speech, with the term speech interference level also being used to designate the above.

To state it in a simplified manner, acoustic transparency is determined from the interaction between the materials used and their attachment or construction. First of all a distinction between air-permeable and air-impermeable materials should be made. In this context the acoustic transparency of air-permeable materials is characterised by their flow resistance. Air-impermeable materials are acoustically transparent only under certain boundary conditions. For example, a thin, lightweight panel-shaped air-impermeable material suspended loosely can transmit a frequency spectrum without hindrance in that the panel does not offer any resistance to the air oscillations, thus making it possible for the sound waves to pass through the layer without hindrance. In contrast to this, the same material when firmly clamped, in particular when clamped at small spacings, offers significantly greater resistance to the impinging sound waves. For this reason the actually achieved effect is decisive to an assessment of the acoustic transparency, rather than consideration in isolation of a material per se or of a particular construction per se.

In a preferred embodiment the flow resistance of the first cover layer does not exceed 1000 Ns/m$^3$.

Such a flow resistance ensures that the cover layer facing the space essentially does not impair the absorbability of the panel. The flow resistance relates to the entire cover layer, in other words, for example, to a lattice prepreg with the decorative element arranged in front of it.

The flow value is an average value of the area under consideration, in which some regions can in principle also be closed more tightly while other regions can be more permeable. In this way it is possible, for example, to create heterogeneous surfaces whose visible area is, for example, textured.

In a particularly preferred exemplary embodiment, the flow resistance of the first cover layer does not exceed 500 Ns/m$^3$.

With this value the cover layer can be considered to be acoustically very transparent.

In a still further preferred embodiment, the flow resistance of the first cover layer is at most 200 Ns/m$^3$.

Below this value a layer is almost completely acoustically transparent. Still lower values lead to barely perceptible improvements.

In conjunction with the acoustic transparency of the cover layer, irrespective of the value achieved, it should, in particular, be ensured that no reflection of the higher frequencies occurs, for example from the surface of the cover layer, because these frequencies then continue to be present as an acoustic load in the space, with the absorber material being unable to absorb them.

In a preferred exemplary embodiment, the first cover layer is of a multilayer design.

This ensures that the individual functions to be carried out by the cover layer can be handled by different materials in different layers.

In a particularly preferred exemplary embodiment, the first cover layer comprises a first lattice prepreg and a cover that forms the first surface, wherein the first lattice prepreg is laminary or two-dimensionally connected to the honeycomb core.

In this arrangement the lattice prepreg carries out static or mechanical tasks in that due to the bond effect or composite effect it stabilises the honeycomb core situated behind it and in this way imparts to the panel the stability and rigidity required for cabin lining. The lattice prepreg is, for example, a lattice structure designed from high-performance fibres and a matrix material, which lattice structure, as a rule, is connected to the faces of the honeycomb walls by means of bonding. Since in this region there is no absorber material in close proximity to the bonding region, it is not possible for resin from the absorber material to be drawn into the honeycomb structure during bonding. In other words, the bonding process and the accuracy required for it during dosing are simplified by the inventive arrangement of the absorbers in the recesses. Lastly, the cover assumes the task of providing the core layer to the panel, and a high-quality visual face to the lattice prepreg.

In conjunction with the use of the prepreg the continuous-honeycomb structure results in a continuous smooth surface of the prepreg, in which surface the so-called telegraphing effect is prevented, i.e. the prepreg is prevented from sagging relative to the surface of a panel, so that no concave impressions arise.

In a preferred embodiment, the cover comprises leather as a surface material.

With correspondingly thin leather and a matching perforation pattern, in this way, for example, flow resistance values of approximately 50 Ns/m$^3$ can be achieved. Leather is particularly suitable for high-quality cabin regions, for example in first class. Due to its relatively hard-wearing surface, leather is also suitable for high-use regions, for example in the region of entries or aisles.

In a preferred alternative embodiment, the cover comprises a woven material as a surface material.

With a woven material it is possible, on the one hand, with a corresponding design, to create an acoustically transparent layer, and, on the other hand to create a visually pleasing surface. In this arrangement it is possible, for example, to use woven materials that comprise the corporate colours of an aircraft operator or which in some other manner reflect the enterprise layout or the corporate identity. In particular, the woven material can also comprise logos or other graphic design means.

Depending on the region of use of the panel within the aircraft cabin, the woven material can be equipped with a coating that provides a self-cleaning effect. For example, such a coating can be realized with titanium dioxide. In this way soiling of the surface, for example in aisle regions, can be prevented.

A further preferred embodiment provides for the cover on the one hand to comprise a degree of acoustic transparency, while on the other hand influencing the acoustic interaction of the cabin panel is already ensured as a result of the structure of the woven material.

In this way it is possible, for example, to further improve the acoustic absorption characteristics or other acoustic characteristics of the panel.

In a preferred embodiment, the covering comprises a multilayer design.

In this way the covering can still better be adapted to the respective requirements, for example further visual characteristics can also be achieved, for example a moiré pattern with the use of woven materials placed one behind the other.

In a preferred embodiment, a nonwoven formed fabric or fleece is provided between the surface material and the first lattice prepreg.

In this way the surface material, which, to put it simply, in the first instance is a decorative element, can be provided with a backing. In this way it is possible, for example, to even out any instances of unevenness in the region of the underlying construction so that improved surface accuracy is provided.

On the other hand in this way it is also possible to achieve different haptic characteristics of the cabin panel, which can, for example in the case of cabin walls, create a higher-quality impression in users, for example in the case of cabin walls that are arranged laterally beside the seats, where as a rule touching by the user takes place, for example if a user laterally leans against the wall. In this situation a softer surface may equate to greater user comfort.

In a preferred embodiment, the weight of unit volume of the absorber is at most as heavy as the weight of unit volume of the honeycomb core.

This ensures that despite improved acoustic characteristics there is no increase in the panel weight. In particular in passenger aircraft, where the design of the cabin space represents a significant share of the construction elements inserted during construction of the aircraft, there is no increase in the weight of the aircraft, a factor which, as already mentioned above, represents a central aspect in aircraft construction.

In a preferred embodiment, several recesses that are spaced apart from each other are arranged in a panel.

This ensures that in relation to the entire panel surface several regions are provided in which the thickness of the honeycomb core corresponds to the depth of the core layer. These regions that also act as webs, together with their height and width, are decisive to the mechanical strength of the entire panel area. Since in their height, i.e. in the direction of the panel thickness, the webs enter into the flexural strength of the sandwich to the power of three, while the web width, i.e. the width in the direction of the panel area, only enters to the power of one, it is especially the thickness of the core layer that is responsible for the flexural strength, i.e. for the stability of the panel.

Furthermore, by corresponding dimensioning of the webs between the recesses the static characteristics of the known panels can be retained, in which panels a continuous honeycomb core is provided between two acoustically transparent cover layers.

In a preferred embodiment, the recesses are arranged in a type of grid in such a way that through-regions without recesses extend between the edges of the panel.

These through-regions assume the function of webs which ensure the flexural strength of the panel. Simply said, load degradation takes place over the area of the panel in the manner of a grid. In this arrangement, in the region of the recesses a two-dimensional load, or a point-shaped load, that acts on the panel is transmitted perpendicularly to the area from the honeycomb core region of lesser depth to the regions of greater depth, which regions then, in the manner of a web, transmit the load to the edges of the panel where said load can be transmitted into the load-bearing structure of the aircraft. Instead of this it is also possible to provide an additional frame structure that is used to receive the interior space panels and that is connected to the aircraft structure. The spacing of the regions designed as webs, and thus also the sizes of the recesses, are therefore directly related to the depth of the core layer. In order to be able to provide the greatest possible absorber ratio, the recesses can be dimensioned such that the webs are as narrow as possible. In this arrangement a small increase in the panel depth already results in a considerable increase in the rigidity of the webs. In other words, by means of a slight increase in the design space the overall panel can be designed so as to be a little thicker in order to implement higher and narrower webs so that the area ratio of the recesses in the panel surface is considerably increased. At the same time it is also possible to design the recesses so that they are deeper; in other words, overall larger and thicker absorbers can be used. In this way the absorbability of the panel is further improved.

In a particularly preferred embodiment, the absorber comprises a lighter weight of unit volume when compared to that of the honeycomb core.

Due to the lighter weight of unit volume of the absorber there is no increase in the panel weight even in the case of substantial overall thicknesses.

In a preferred embodiment, the absorbers comprise glass wool that is contained in a wrapping or envelope.

Glass wool is a material that is suitable as an absorber for a wide frequency spectrum, which material is additionally very lightweight and also economical. The wrapping or envelope ensures simpler handling during the manufacture of the panels and also ensures that the glass wool does not spread in the panel, for example does not enter the honeycomb structure arranged in front of it. The wrapping or envelope is designed so as to be acoustically transparent so that the sound can enter the actual absorber material, i.e. the glass wool, without hindrance. Incorporating recesses ensures that the glass wool in the form of the glass wool packages is reliably and permanently held. If the glass wool packages comprise relatively small dimensions, any settling of the glass wool over time is also prevented. This obviates the need to provide additional carrier materials for holding the glass wool.

In an alternative embodiment, the absorbers comprise a foam or an open-cell cellular material.

Foam or open-cell cellular materials also feature good absorbability. As a rule they are produced as panel-shaped semifinished products which in simple processing operations can be cut to panel sizes that correspond to the recesses. This results in a simple as possible production method because the open-cell cellular materials in the form of smaller panels can be handled with ease.

In a further preferred embodiment, the foam or open-cell cellular materials comprise a wrapping or envelope.

Consequently it is also possible to use cellular materials that are present as loose or very brittle materials, i.e. cellular materials other than panel-shaped semifinished products that are simple to handle.

Of course, other materials can also be provided as absorber elements, which materials comprise a wrapping or envelope and which are then inserted into the recess.

In the production of the recesses it is particularly advantageous if the absorbers merely need to be placed in, or inserted into, the recess. Because of the second cover layer, which extends over the entire rear region of the panel, the absorbers are held in the recesses.

Since the absorber materials, for example glass wool, are at the same time also materials associated with a low heat transfer coefficient, the absorbers distributed in the panels at the same time also act as thermal insulation elements so that the cabin panels, in particular if the webs are narrow, provide additional thermal insulation. Consequently it becomes possible, as a rule, to reduce the insulation layers provided in the construction of the exterior wall, which reduction results in an additional weight advantage as well as a reduction in the design space required for the construction of the exterior wall.

In a further preferred embodiment, the second cover layer is designed so as to be impermeable to water.

Consequently any ingress of condensation into the panels is prevented, which condensation can often not be prevented from arising in the region between the exterior skin of the aircraft and the cabin wall.

In a further preferred embodiment, the second cover layer is designed so as to be acoustically closed.

This prevents any acoustic transmission of the sound arising outside the cabin region from entering the cabin through the cabin wall. Since the component is thus acoustically transparent only on one side, apart from its absorption characteristics it also comprises an extent of acoustic insulation. In this arrangement the extent of acoustic insulation is determined by the design of the second cover layer. Since the second cover layer is situated on the side facing away from the cabin, in this location designs and materials can be used that optimise the extent of acoustic insulation, in which designs and materials the visual effect need not be taken into account. In other words, it is possible in a simplified manner to achieve a greater extent of acoustic insulation of the component. The panel according to the invention thus overall results in a significant reduction in the noise level inside the aircraft.

In a preferred embodiment, the second cover layer is of a multilayer design and comprises a second lattice prepreg.

In this arrangement, in the region of the webs the second lattice prepreg is connected over its entire area to the front edges of the honeycomb structure in a manner that is similar to that of the first lattice prepreg at the front of the panel. The second lattice prepreg contributes to a further improvement in the static and mechanical characteristics of the panel in that it additionally stabilises the core structure. Furthermore, the lattice prepreg assumes the function of holding the absorbers in the recesses.

In a design as an acoustically closed rear cover layer this acoustic function is ensured by further layers that are arranged behind the second lattice prepreg when viewed from the interior of the space.

In a further preferred embodiment, at the edges of the panel the honeycomb core extends across the thickness of the core layer.

Thus at its circumferential edges the panel comprises a honeycomb core that is continuously throughout relative to the thickness of the panel. This ensures that a panel is provided whose materials and constructions in its connection geometries and region of the connections do not differ from known panels in which a sandwich construction is formed by a honeycomb structure with two cover layers. This results in an advantage in that the panel according to the invention can also be used in combination with conventional cabin panels. Moreover, the panel according to the invention is also suitable for subsequent use in already existing structures, for example in the context of periodic refurbishment of aircraft cabins or so-called retrofittings.

The invention also provides for an aircraft with a fuselage structure and a cabin designed so as to be within the fuselage, which cabin is at least in part enclosed by an interior lining comprising panels. According to the invention at least some of the panels are sound-absorbing panels according to any one of the preceding embodiments.

Consequently, an aircraft is provided in which the acoustic interior conditions in the cabin are improved to the effect that due to the improved absorption characteristics of the interior lining there is a reduction of interior noise in the aircraft. In this arrangement the panels according to the invention ensure that despite an improvement in the acoustic characteristics there is no increase in the component weight, which at the same time would result in increased fuel consumption of the aircraft during operation. There is a further advantage in that compared to those panels in which an additional absorber element is arranged on the rear, the panels according to the invention require less installation space. As a result of this more space is available for the actual use of the cabin, which results in an additional enhancement in user convenience. An increase in the useful area is tantamount to improved usage of the aircraft, which in turn is associated with economic advantages.

It should be pointed out that while the wording in the above presentation and in the following descriptions of exemplary embodiments and the claims relates to an aeroplane, it is understood that in the context of the present invention any aircraft is included, in particular also helicopters. The invention and the scope of protection of the claims thus relates to aircraft in general, for example including aeroplanes and helicopters, not just to aeroplanes.

BRIEF DESCRIPTION OF THE DRAWINGS

Below, an exemplary embodiment of the invention is presented with reference to the enclosed drawings. The following are shown:

FIG. 2 a diagrammatic section view of an aircraft cabin panel according to the invention, along section line B-B of FIG. 3; and FIG. 3 a section of an aircraft cabin panel according to the invention, along section line A-A of FIG. 2.

DETAILED DESCRIPTION

Figure 1:
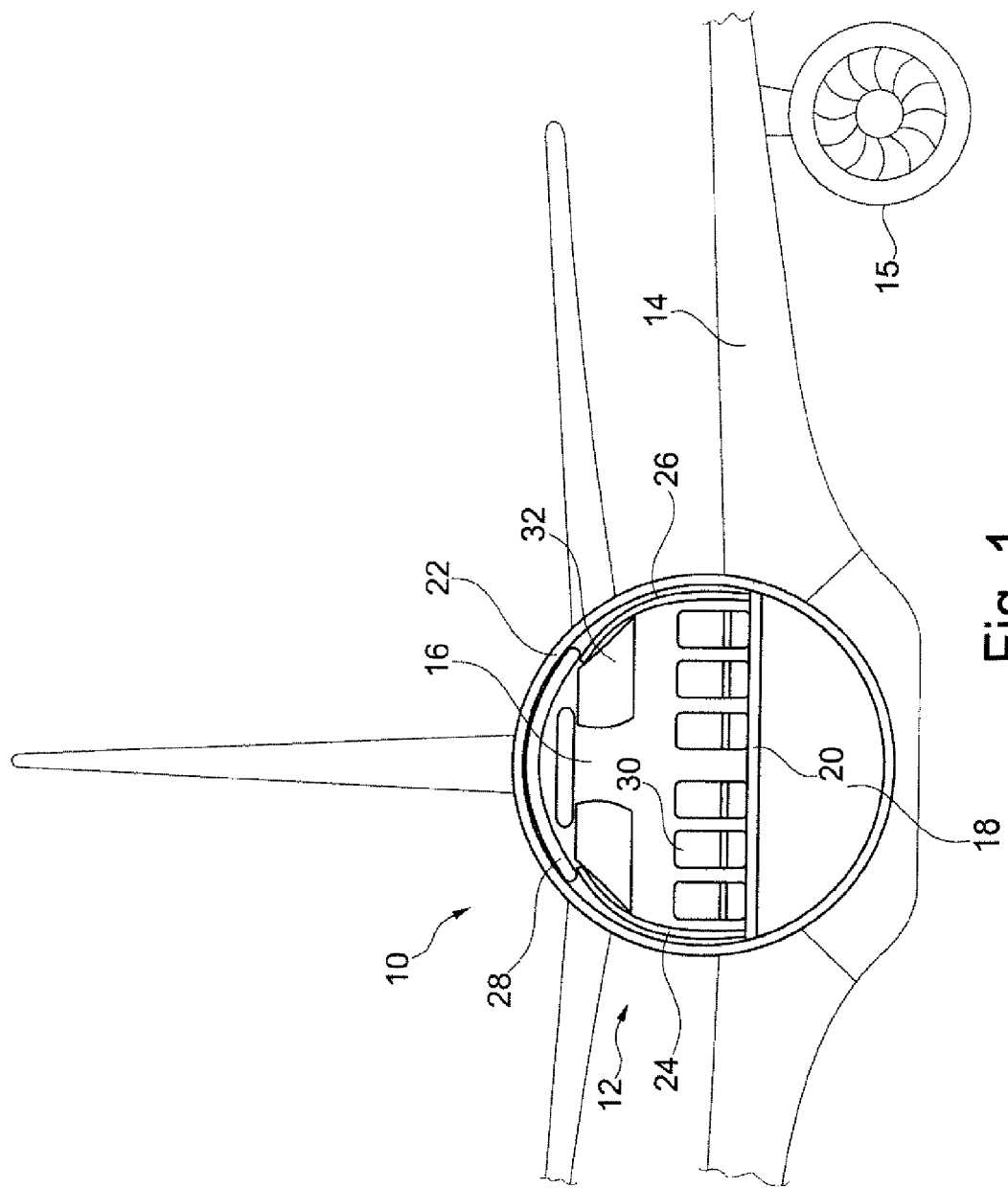
FIG. 1 a cross section of an aircraft with a cabin lining with cabin panels according to the invention.

FIG. 1 shows an aircraft 10 with an aircraft fuselage 12 and two wings 14, each being laterally connected to said fuselage 12, with engines 15 being provided on the wings 14. FIG. 1 shows the aircraft fuselage 12 in a section view across its longitudinal axis. The aircraft fuselage 12 is divided, by a horizontally extending floor 20, into an upper cabin region 16 and a freight region 18, arranged below. The aircraft fuselage 12 further comprises an essentially circumferential exterior skin 22 of the aircraft, which exterior skin 22 is attached to an aircraft fuselage structure (not shown in detail). In simple terms the aircraft fuselage structure comprises a type of load-bearing structure made of frame elements and stringers, thus ensuring a stable construction to take up the external and internal loads.

In the cabin region 16, which is arranged above the floor 20, along the exterior wall 22 there are lateral cabin lining elements 24, 26 as well as an upper cabin lining 28 provided in the upper region.

Together with the floor 20 the elements of the cabin lining 24, 26, 28 enclose an interior space, i.e. the cabin. Within the cabin, for example, seats 30 for passengers are arranged. Furthermore, for example, there are stowage bins or hatracks 32 which are essentially arranged above the seat rows and which are used for storing passengers' cabin baggage. Moreover, various supply lines (not shown in FIG. 1), for example for oxygen supply, electrical supply or for the air conditioning plant, are provided in the cabin region 16.

The external loads, for example wind loads and loads that result from pressure differentials, that act on the fuselage region are transmitted from the exterior skin 22 to the load-bearing structure of the aircraft fuselage and are thus led away. In order to provide suitable environmental conditions in the cabin, thermal insulation is also provided in the exterior wall structure. Furthermore, the exterior wall construction is designed to be as sound-insulating as possible so as to limit to a minimum the noise input from the turbines 15 to the cabin 16.

Apart from the space-enclosing function of the cabin lining elements 24, 26, 28, according to the invention said cabin lining elements 24, 26, 28 are also used to influence the acoustic conditions within the cabin 16. To this effect the cabin panels 24, 26, 28 are designed so as to be sound absorbing, which is explained in more detail below with reference to FIGS. 2 and 3.

FIG. 2 diagrammatically shows a longitudinal section of an aircraft cabin panel 40, wherein the longitudinal section extends along the section line B-B of FIG. 3. FIG. 3 shows a cross section of the panel 40 of FIG. 2 along the section line A-A.

The aircraft cabin panel 40 comprises a core layer 42 and a first cover layer 44 as well as a second cover layer 46. The first cover layer 44, i.e. the cover layer facing downwards in FIG. 3, comprises a space-enclosing first surface 48. The second cover layer 46 is arranged opposite the first cover layer 44, i.e. on the other side of the core layer 42, and faces the exterior skin 22 (not shown) of the cabin.

The core layer 42 comprises a honeycomb core 50 with a multitude of tubular or honeycomb-like cells 52 which extend so as to be open throughout the thickness of the honeycomb core 50. The cells 52 are separated from each other by lateral cell walls 54. On the side facing the first cover layer 44, i.e. in FIG. 3 in the lower region of the honeycomb core 50, said honeycomb core 50 extends continuously throughout, parallel to the first cover layer 44. On the other side, i.e. on the side facing the second cover layer 46, the honeycomb core 50 comprises recesses 56. Absorbers 58 are accommodated in the recesses 56.

The first cover layer 44 is designed to be acoustically transparent in order to ensure that the sound waves that impinge on the panel 40 from the sides of the interior space, i.e. in FIG. 3 from below, can enter the core layer 50 as far as possible in an unimpeded manner. After passing through the first cover layer 44, the sound waves pass through the open cells 52 of the honeycomb core, and in the region of the recesses 56 impact the absorbers 58 where acoustic absorption then takes place.

Since on the side of the first cover layer 44 the honeycomb core 50 is designed so as to be continuously throughout, an aircraft cabin panel is provided that has the smoothest possible surface towards the interior space. In order to provide the best-possible surface quality of the panel, the first cover layer 44 is of a multilayer design and comprises a lattice prepreg 60 that is connected in a laminary or area wise manner to the honeycomb core. Furthermore, a covering 62 that forms the first surface 48 is provided, wherein the covering 62 comprises, for example, a woven fabric as a surface material.

Preferably, the covering is of a multilayer design so that a nonwoven formed fabric (not shown in FIG. 3) can be provided between the woven fabric 62 and the lattice prepreg 60. Among other things, the material of the nonwoven formed fabric between the woven fabric 62 and the first lattice prepreg 60 also serves to compensate for unevenness in the core layer 42 in order to obtain a visually pleasing surface of the panel that is of the highest possible quality.

The acoustic transparency of the first cover layer 44 is achieved in that the flow resistance of the first cover layer 44 does not exceed 1000 Ns/m$^3$.

As a result of this, noise that is present in the cabin region 16, for example noise that is generated by persons themselves or by air conditioning plant, can enter the panel 40 where it is absorbed by the absorbers 58.

In relation to the panel 40, several recesses 56 are arranged evenly distributed so that between the recesses 56 regions 64 are created in which the honeycomb core 50 is in its full thickness, i.e. the thickness of the core layer 42. In this way the regions 64 virtually form webs that extend between the edges of the panel 40. The webs ensure the required flexural rigidity, i.e. the stability of the panel 40.

For example, open-cell cellular materials or foams can be used as absorbers 56, wherein those cellular materials are particularly suitable that are available as panel-shaped semi-finished products. As an alternative, the absorbers 58 can, for example, also comprise glass wool that is contained in a wrapping or envelope. According to the invention, different absorber materials can be used in one panel, e.g. glass wool packages in recesses in a lower region, and cellular materials in recesses in an upper region.

Irrespective of the material used in the absorbers, the weight of unit volume of the absorbers should at most be as heavy as the weight of unit volume of the honeycomb core. This ensures that the panel 40 overall is no heavier than a comparable panel without absorption characteristics, i.e. a panel with a honeycomb core between two cover layers.

The second cover layer 46 is designed so as to be impermeable to water so as to prevent any ingress of condensation that may arise in the region between the cabin wall and the exterior wall. Furthermore, the invention provides for the second cover layer 46 to be designed so as to be acoustically closed so as to prevent the penetration of sound from the region outside the cabin, for example noise generated by the turbines, despite the acoustic insulation of the exterior wall 22.

For example, the second cover layer 46 can comprise a second lattice prepreg 66 which in the region of the webs is connected over its entire area to the honeycomb core, for example in that the second lattice prepreg 66 is bonded to the edges of the honeycomb walls 54. In this way the core structure 50 is additionally stabilised, which results in an improvement in the flexural strength of the panel 40. It is then possible, on the second lattice prepreg 66, to provide suitable two-dimensional materials for acoustic insulation in order to provide a panel which overall results in a significant reduction in the interior noise in the aircraft.

Depending on the region of use of the panel 40 within the aircraft cabin, the front of the woven material 62 can be equipped with a coating that provides a self-cleaning effect. For example, such a coating can be realized with titanium dioxide.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. An aircraft cabin panel for acoustic absorption in an interior space, the aircraft cabin panel comprising:
a core layer;
a first cover layer;
a second cover layer; and
a plurality of absorbers;
wherein the first cover layer comprises a space-enclosing first surface;
wherein the second cover layer is arranged opposite the first cover layer;
wherein the first cover layer is configured be acoustically transparent;
wherein the core layer comprises a honeycomb core with a plurality of tubular or honeycomb-like cells that are open throughout the thickness of the honeycomb core;
wherein the honeycomb core on the face pointing towards the first cover layer extends parallel to the first cover layer so as to be continuously throughout, and on the face pointing towards the second cover layer comprises a plurality of recesses which extend over one or more of the plurality of cells; and
wherein each of said absorbers is accommodated in one of the recesses.

2. The panel of claim 1, wherein the first cover layer is of a multilayer design and comprises a first lattice prepreg and a covering that forms the first surface, wherein the first lattice prepreg is laminary connected to the honeycomb core.

3. The panel of claim 2, wherein the covering comprises a woven fabric as a surface material.

4. The panel of claim 2, wherein the covering is of a multilayer design.

5. The panel of claim 4, wherein a nonwoven formed fabric is provided between the surface material and the first lattice prepreg.

6. The panel of claim 1, wherein the flow resistance of the first cover layer does not exceed 1000 Ns/m3.

7. The panel of claim 1, wherein the weight of unit volume of the absorbers is at most as heavy as the weight of unit volume of the honeycomb core.

8. The panel of claim 1, wherein the absorbers comprise glass wool that is contained in a wrapping or envelope.

9. The panel of claim 1, wherein the absorbers comprise a foam.

10. The panel of claim 1, wherein the second cover layer is impermeable to water.

11. The panel of claim 1, wherein the second cover layer is acoustically closed.

12. The panel of claim 1, wherein the second cover layer is of a multilayer design and comprises a second lattice prepreg.

13. The panel of claim 1, wherein, at the edges of the panel, the honeycomb core extends across the thickness of the core layer.

14. An aircraft comprising:
a fuselage structure; and
a cabin located within the fuselage, wherein the cabin is at least in part enclosed by an interior lining comprising a plurality of panels, the panels comprising
a core layer;
a first cover layer;
a second cover layer; and
a plurality of absorbers;
wherein the first cover layer comprises a space-enclosing first surface;
wherein the second cover layer is arranged opposite the first cover layer;
wherein the first cover layer is configured to be acoustically transparent;
wherein the core layer comprises a honeycomb core with a plurality of tubular or honeycomb-like cells that are open throughout the thickness of the honeycomb core;
wherein the honeycomb core on the face pointing towards the first cover layer extends parallel to the first cover layer so as to be continuously throughout, and on the face pointing towards the second cover layer comprises a plurality of recesses which extend over one or more of the plurality of cells; and
wherein each of said absorbers are accommodated in one of the recesses.

* * * * *

UNITED STATES PATENT AND TRADEMARK OFFICE
CERTIFICATE OF CORRECTION

PATENT NO. : 8,336,804 B2
APPLICATION NO. : 12/639132
DATED : December 25, 2012
INVENTOR(S) : Stephan Hoetzeldt and Christian Thomas It is certified that error appears in the above-identified patent and that said Letters Patent is hereby corrected as shown below:

In the Claims

Column 11, line 22, after "configured" insert -- to --.
Column 12, line 2, "Ns/m3" should read -- $Ns/m^3$ --.

Signed and Sealed this
First Day of September, 2015

Michelle K. Lee
*Director of the United States Patent and Trademark Office*